(12) United States Patent
Sengupta et al.

(10) Patent No.: US 12,413,622 B2
(45) Date of Patent: Sep. 9, 2025

(54) SYSTEM AND METHOD FOR GENERATING CYBER THREAT INTELLIGENCE

(71) Applicant: Whizhack Technologies Pvt. Ltd., Haryana (IN)

(72) Inventors: Sanjay Sengupta, Haryana (IN); Mahesh Banerjee, Haryana (IN)

(73) Assignee: Whizhack Technologies Pvt. Ltd. (IN)

( * ) Notice: Subject to any disclaimer, the term of this patent is extended or adjusted under 35 U.S.C. 154(b) by 303 days.

(21) Appl. No.: 17/944,778

(22) Filed: Sep. 14, 2022

(65) Prior Publication Data

US 2023/0379361 A1 Nov. 23, 2023

(30) Foreign Application Priority Data

May 17, 2022 (IN) .............................. 202211028366

(51) Int. Cl.
*H04L 9/40* (2022.01)
(52) U.S. Cl.
CPC ...... *H04L 63/1491* (2013.01); *H04L 63/1416* (2013.01); *H04L 63/1425* (2013.01)
(58) Field of Classification Search
CPC ............. H04L 63/1491; H04L 63/1416; H04L 63/1425
See application file for complete search history.

(56) References Cited

U.S. PATENT DOCUMENTS

| 11,934,948 | B1* | 3/2024 | Ferguson-Walter | ... G06N 3/045 |
|---|---|---|---|---|
| 2012/0167208 | A1* | 6/2012 | Buford | .................. H04M 3/436 726/22 |
| 2015/0128246 | A1* | 5/2015 | Feghali | ............... H04L 63/0209 726/13 |
| 2017/0324768 | A1* | 11/2017 | Crabtree | ............. H04L 63/1433 |
| 2017/0329783 | A1* | 11/2017 | Singh | .................. H04L 63/1441 |
| 2021/0194853 | A1* | 6/2021 | Xiao | ..................... H04L 43/028 |
| 2022/0414245 | A1* | 12/2022 | Diamant | ............... H04L 63/145 |

FOREIGN PATENT DOCUMENTS

CN 111641620 A * 9/2020

* cited by examiner

*Primary Examiner* — Han Yang
(74) *Attorney, Agent, or Firm* — Spencer Fane, LLP (57) ABSTRACT

The present disclosure provides a system for generating cyber threat intelligence. The system includes a plurality of honeynets configured to emulate one or more services; a plurality of sensors, each sensor associated with a honeynet, each sensor configured to detect cyberattacks on the associated honeynet; a data collector configured to receive data relating to the cyberattacks on the plurality of honeynets; and a computing device configured to detect, from the sensors, one or more cyberattacks on the honeynets based on analysis of network traffic through the honeynets; extract, from detected cyberattacks on the honeynets, a detailed forensic data log based on analysis of content of the data packets pertaining to the cyberattacks on the honeynets; and transmit the detailed forensic data log to the data collector. The data collector stores the detailed forensic data log for further analysis in order to generate cyber threat intelligence.

4 Claims, 8 Drawing Sheets

SYSTEM AND METHOD FOR GENERATING CYBER THREAT INTELLIGENCE

TECHNICAL FIELD

The present disclosure relates to a system and method for generating cyber threat intelligence by utilizing honeynets to emulate vulnerable services.

BACKGROUND

Background description includes information that may be useful in understanding the present invention. It is not an admission that any of the information provided herein is prior art or relevant to the presently claimed invention, or that any publication specifically or implicitly referenced is prior art.

The rapid adaptation of technologies like automation, cloud computing, internet of things (IoT), and artificial intelligence (AI) in various fields has led to initiatives such as Industry 4.0, Smart Cities, Smart homes, etc. Such initiatives are aimed at improving the quality of living by providing highly scalable smart services and applications in various domains such as health care, administration, industrial processes, etc.

However, this widescale adoption of such technologies in conventional industries and other establishments has induced a unique and widespread threat landscape that can be exploited for launching large-scale attacks impacting millions of people. Since the technologies are still far from being secure in terms of the exposed attack surfaces as well as the number of breakpoints in the distributed architecture that they follow, there is a potential for exploitation by attackers for infiltrating and then compromising the whole system as well as the infrastructure.

Generally, such attack surfaces and breakpoints are secured by continuous monitoring and taking proactive actions, or by introducing a deception mechanism. While the attackers are distracted with the decoy computer systems it may be possible to glean information relating to the attackers and their methods of attack. This method may help in further reducing the probability of attacks on the actual attack surfaces and deflecting the attacks to some decoys or honeypots. Such honeypots are further utilized for acquiring crucial cyber threat intelligence generated from the attacks they deflect, and the intelligence may be used for designing effective protocols for preventing similar types of attacks with a higher degree of probability in the future. In addition, these deception techniques heavily focus on collecting the host activity information in the form of log files. These log files may reveal the activity done by the attacker while compromising the honeypot after the attacker gains access to the honeypot. These deception techniques perform reasonably well and can deflect attacks to some extent, mostly automated attacks launched using bots or novice attackers known as script kiddies. However, experienced attackers may identify the honeypots by identifying certain characteristics, such as multiple low-interaction honeypots emulating unrelated vulnerable services running on multiple open ports in a single machine.

Generally, a multitude of low-Interaction honeypots emulating real services such as web servers, FTP servers, mail servers, etc, are used inside a single host machine. Such a type of centralized architecture is simple, easy to implement, and allows a lot of services to be emulated on a single central node. However, it may become easier for the attackers to detect a honeynet since a single machine is used for emulating a lot of services, which may correspond to a single server running a lot of disjointed services, prone to a single point of failure in case the host itself gets compromised.

SUMMARY

In an aspect, the present disclosure provides a system for generating cyber threat intelligence. The system includes a plurality of honeynets configured to emulate one or more services. The system further includes a plurality of sensors, each sensor associated with a honeynet, each sensor configured to detect cyberattacks on the associated honeynet. The system further includes a data collector configured to receive data relating to the cyberattacks on the plurality of honeynets. The system further includes a computing device communicably coupled to the plurality of honeynets, the plurality of sensors and the data collector, the computing device including a processor communicably coupled to a memory, the memory storing instructions, which when executed by the processor causes the computing device to be configured to detect, from the sensors, one or more cyberattacks on the honeynets based on analysis of network traffic through the honeynets. The computing device is further configured to extract, from detected cyberattacks on the honeynets, a detailed forensic data log based on analysis of content of the data packets pertaining to the cyberattacks on the honeynets. The computing device is further configured to transmit the detailed forensic data log to the data collector. The data collector stores the detailed forensic data log for further analysis in order to generate cyber threat intelligence.

In some embodiments, each of the plurality of sensors includes an intrusion detector configured to detect the one or more cyberattacks on the honeynets based on analysis of network traffic through the honeynets; and a deep packet inspection engine configured to extract, from detected cyberattacks on the honeynets, the detailed forensic data log based on analysis of content of the data packets pertaining to the cyberattacks on the honeynets.

In some embodiments, each of the plurality of sensors further includes a data logging unit configured to perform pre-processing of the extracted detailed forensic data log prior to transmission of the forensic data log.

In some embodiments, the data collector includes a data collection unit configured to process and index the forensic data log received from the sensors; and a visualization unit configured to dynamically render and load the processed and indexed forensic data log in real-time.

In some embodiments, the data collection unit is further configured to provide a user management and overall stack management functionalities.

In some embodiments, the data collection unit and the visualization unit are placed under a load balancer, wherein the load balancer is configured to spawn additional resources as per load requirement.

In some embodiments, the system is dynamically scalable.

In another aspect, the present disclosure provides a method for generating cyber threat intelligence. The method includes detecting, at a computing device, from the sensors, one or more cyberattacks on the honeynets based on analysis of network traffic through the honeynets. The method further includes extracting, at the computing device, from detected cyberattacks on the honeynets, a detailed forensic data log based on analysis of content of the data packets pertaining to the cyberattacks on the honeynets. The method further includes transmitting, by the computing device, the detailed forensic data log to the data collector. The data collector stores the detailed forensic data log for further analysis in order to generate cyber threat intelligence.

BRIEF DESCRIPTION OF DRAWINGS

The accompanying drawings are included to provide a further understanding of the present disclosure and are incorporated in and constitute a part of this specification. The drawings illustrate exemplary embodiments of the present disclosure and, together with the description, serve to explain the principles of the present disclosure.

DETAILED DESCRIPTION

The following is a detailed description of embodiments of the disclosure depicted in the accompanying drawings. The embodiments are in such details as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

Generally, a multitude of low-Interaction honeypots emulating real services such as web servers, FTP servers, mail servers, etc, are used inside a single host machine. Such a type of centralized architecture is simple, easy to implement, and allows a lot of services to be emulated on a single central node. However, it may become easier for attackers to detect a honeynet since a single machine is used for emulating a lot of services, which may correspond to a single server running a lot of disjointed services, prone to a single point of failure in case the host itself gets compromised. In addition, these deception techniques heavily focus on collecting the host activity information in the form of log files. These log files may reveal the activity done by the attacker while compromising the honeypot after the attacker gains access to the honeypot.

Although the logs reveal the tools and techniques used by the attackers for compromising the machine on a host level, they do not help in revealing the techniques used by the attacker for identifying the target and gaining access to the target. To overcome this issue honeypots may be coupled with intrusion detection systems which help in identifying the techniques used by the attacker to gain access to the target using pre-defined signatures, which however allows newer exploitation techniques to go undetected. Detecting the new techniques used by the attackers for identifying the targets and exploiting them requires a cyclic network traffic analysis framework where the traffic of these honeypots may be analyzed.

Generally, activities of such malware may be studied by analyzing the operation logs of the honeypot. This further enables the generation of threat intelligence about the tools and techniques used by the attackers.

In an aspect, the present disclosure provides a system for generating cyber threat intelligence. The system includes a plurality of honeynets configured to emulate one or more services. The system further includes a plurality of sensors, each sensor associated with a honeynet, each sensor configured to detect cyberattacks on the associated honeynet. The system further includes a data collector configured to receive data relating to the cyberattacks on the plurality of honeynets. The system further includes a computing device communicably coupled to the plurality of honeynets, the plurality of sensors and the data collector, the computing device including a processor communicably coupled to a memory, the memory storing instructions, which when executed by the processor causes the computing device to be configured to detect, from the sensors, one or more cyberattacks on the honeynets based on analysis of network traffic through the honeynets. The computing device is further configured to extract, from detected cyberattacks on the honeynets, a detailed forensic data log based on analysis of content of the data packets pertaining to the cyberattacks on the honeynets. The computing device is further configured to transmit the detailed forensic data log to the data collector. The data collector stores the detailed forensic data log for further analysis in order to generate cyber threat intelligence.

In some embodiments, each of the plurality of sensors includes an intrusion detector configured to detect the one or more cyberattacks on the honeynets based on analysis of network traffic through the honeynets; and a deep packet inspection engine configured to extract, from detected cyberattacks on the honeynets, the detailed forensic data log based on analysis of content of the data packets pertaining to the cyberattacks on the honeynets.

In some embodiments, each of the plurality of sensors further includes a data logging unit configured to perform pre-processing of the extracted detailed forensic data log prior to transmission of the forensic data log.

In some embodiments, the data collector includes a data collection unit configured to process and index the forensic data log received from the sensors; and a visualization unit configured to dynamically render and load the processed and indexed forensic data log in real-time.

In some embodiments, the data collection unit is further configured to provide a user management and overall stack management functionalities.

In some embodiments, the data collection unit and the visualization unit are placed under a load balancer, wherein the load balancer is configured to spawn additional resources as per load requirement.

In some embodiments, the system is dynamically scalable.

In another aspect, the present disclosure provides a method for generating cyber threat intelligence. The method includes detecting, at a computing device, from the sensors, one or more cyberattacks on the honeynets based on analysis of network traffic through the honeynets. The method further includes extracting, at the computing device, from detected cyberattacks on the honeynets, a detailed forensic data log based on analysis of content of the data packets pertaining to the cyberattacks on the honeynets. The method further includes transmitting, by the computing device, the detailed forensic data log to the data collector. The data collector stores the detailed forensic data log for further analysis in order to generate cyber threat intelligence.

Figure 1:
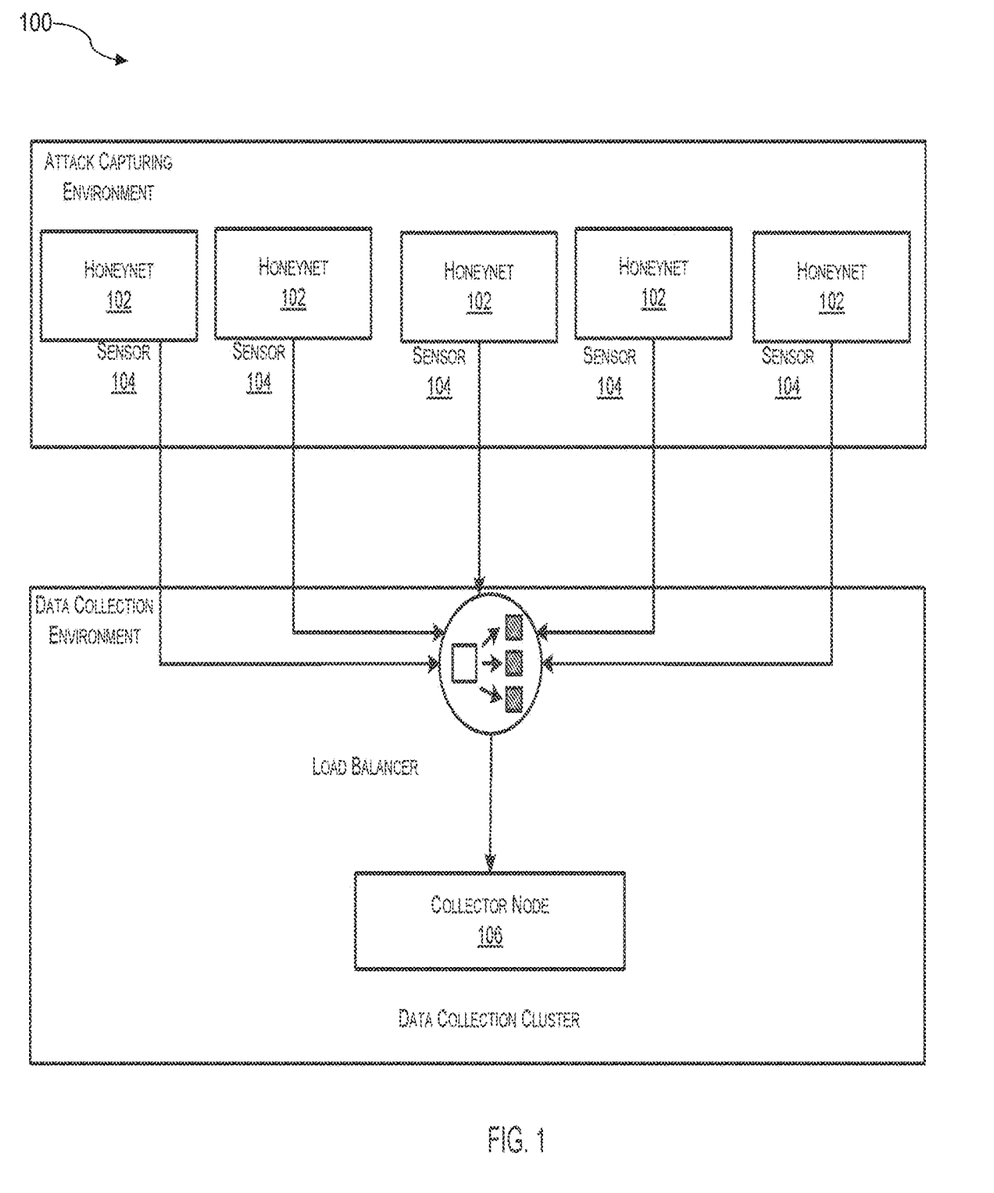
FIG. 1 illustrates a schematic diagram of an architecture for a system for generating cyber threat intelligence, according to an embodiment of the present disclosure.

FIG. 1 illustrates a schematic diagram of an architecture for a system 100 for generating cyber threat intelligence, according to an embodiment of the present disclosure. The proposed architecture decouples honeypots based on the dissimilarity of services they are emulating, and forms the honeypots into honeynets 102, such that each honeynet 102 includes honeypots that emulate similar kind of service. For example, honeypots emulating FTP servers, Web Servers and SMTP Servers are coupled to form a honeynet and are installed in a single machine. In another example, honeypots emulating SMB services, SSH services, etc. are coupled to form a honeynet. Such an arrangement makes it harder for automated bots and hackers to differentiate honeynets from actual servers. Further, each pool of honeypots has a dedicated intrusion detection system, a deep packet inspection engine, and a data logging mechanism for the generation of activity logs of the attackers for further analysis. The inclusion of such dedicated units for data logging and analytics generation for each of the honeynets may help in achieving a distributed architecture that enables specialized attack analysis as well as provide a failsafe mechanism. In the event of a particular honeypot or a honeynet getting compromised, that honeypot or honeynet may be restored without affecting the rest of the honeynets. The data gathered from these honeynets may be sent to a common data collection group, which analyses the data and generates threat intelligence and insights. This type of architecture enables deployment of a large number of honeynets containing various honeypots.

The system 100 includes a plurality of sensors 104, each of the sensors 104 associated with a honeynet 102, and a centralised data collector 106 configured to store data captured by the sensors 104.

In some embodiments, the system 100 is configured such that the sensors 104 and the data collector 106 may be deployed on multiple cloud platforms as per the requirements, using an automated installation and provisioning facility. This facility not only provisions the hardware infrastructure required but also provides functionality for automated installation of these submodules on the provisioned infrastructure as well.

Further, in some embodiments, the system 100 may be highly scalable. This is achieved by configuring the system 100 such that a plurality of sensors may be automatically installed, which may send the threat data to a dynamically configurable data collector. This setup allows threat data to be sent from the sensors 104 to the data collector 106. The deployment of the sensors 104 in the cloud infrastructure using the facilities in the system 100 requires that the whole mechanism to be highly distributed. This distributed arrangement of the components allows the sensors 104 to be recovered individually in an event of a compromise or generic failure. Furthermore, since the data collector 106 receives all the threat data from the plurality of sensors 104, the data collector 106 is also required to be scalable.

Figure 2:
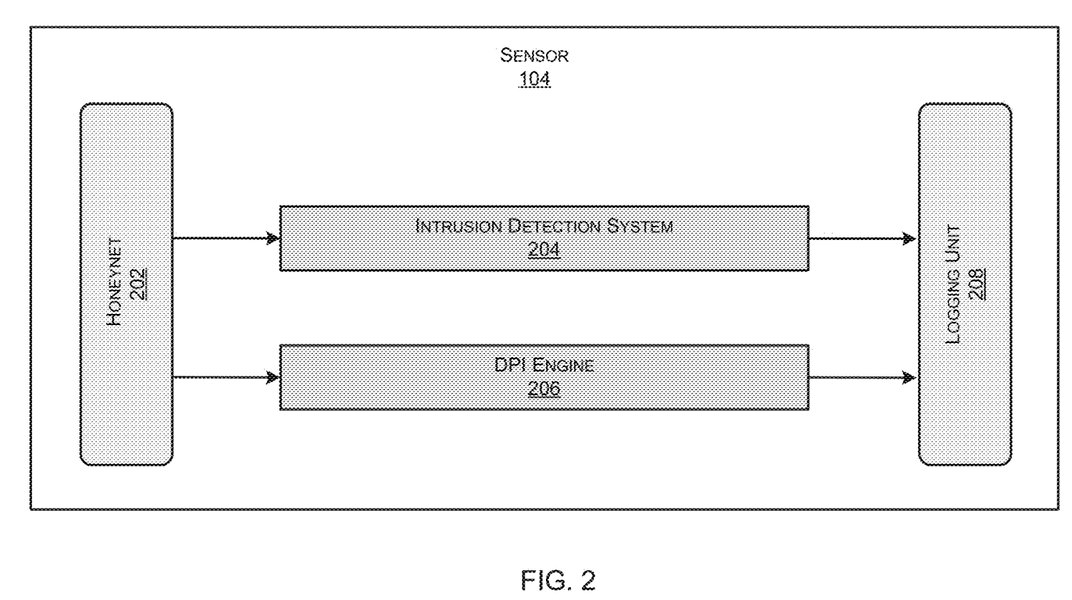
FIG. 2 illustrates a schematic block diagram of a sensor of the system, according to an embodiment of the present disclosure.

FIG. 2 illustrates a schematic block diagram of a sensor 104 of the system 100, according to an embodiment of the present disclosure. The sensor 104 is configured for the generation of threat intelligence from live attack data captured by the honeynets 102. Each sensor 104, in turn, includes a plurality of honeynets 202 deployed as microservices for capturing attack-related data such as collecting attacker activity logs, an intrusion detector 204 for collecting intrusion alert logs, a deep packet inspection (DPI) engine 206 for extracting network forensics data, and a data logging unit 208 that processes the activity log data, intrusion alerts log data along with the network forensics data and sends it to the data collector 106 for further generation of threat intelligence. The sensors 104 are designed in such a way that if they are compromised, they can clean themselves up after some time and come back online without manual intervention.

Figure 3:
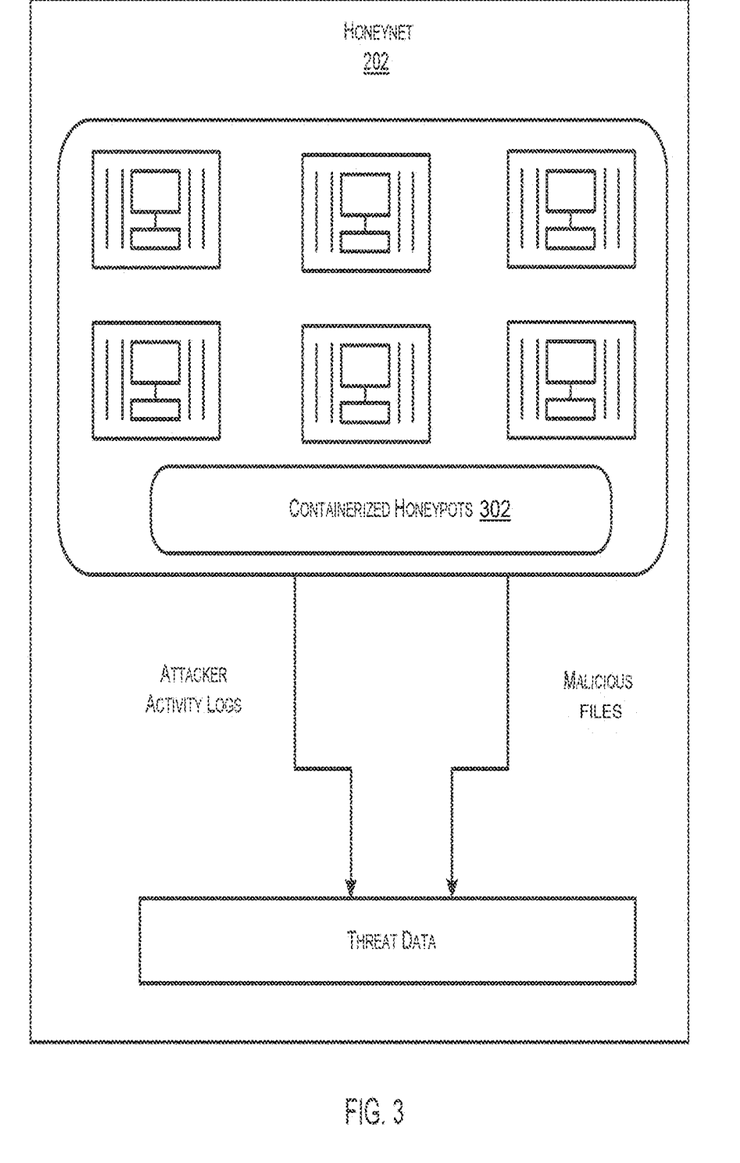
FIG. 3 illustrates a schematic block diagram of a honeynet of the sensor, according to an embodiment of the present disclosure.

FIG. 3 illustrates a schematic block diagram of a honeynet 202 of the sensor 104, according to an embodiment of the present disclosure. The honeynet 102 is configured to primarily to capture attack data by emulating vulnerable services for luring attackers. The activities related to the attacks are recorded by honeypots 302 by interacting with the attacker. Generally, emulating these services requires these services to run in isolation because if one service gets compromised it can affect other services deployed in the same host.

In some embodiments, the honeynet 202 is deployed as isolated microservices with independent virtualized hardware resources. As a result, multiple services may be implemented on a single machine for gaining better computation efficiency as well as resource optimization. Further, the implementation of multiple similar types of services inside a single host machine further aids in dramatically increasing the number of machines that may be deployed, each machine running different kinds of vulnerable services without needing computationally expensive resources. Furthermore, such an implementation may aid in providing better deception from the attackers as this arrangement resembles the deployment of the legitimate services.

In some embodiments, the intrusion detector 204 is configured for capturing the intrusion alerts from the traffic captured from the honeypots deployed in each honeynet 102. The intrusion detector 204 captures the attacks using a signature-based ruleset. The ruleset defines malicious connections on the basis of predefined signatures such as blacklisted IPs of known CnC servers, and other known malicious patterns observed from the network traffic. The intrusion detector 204 provides alert logs that are used for gathering threat intelligence from the network activity of the honeypots present in the honeynets 102.

Figure 4:
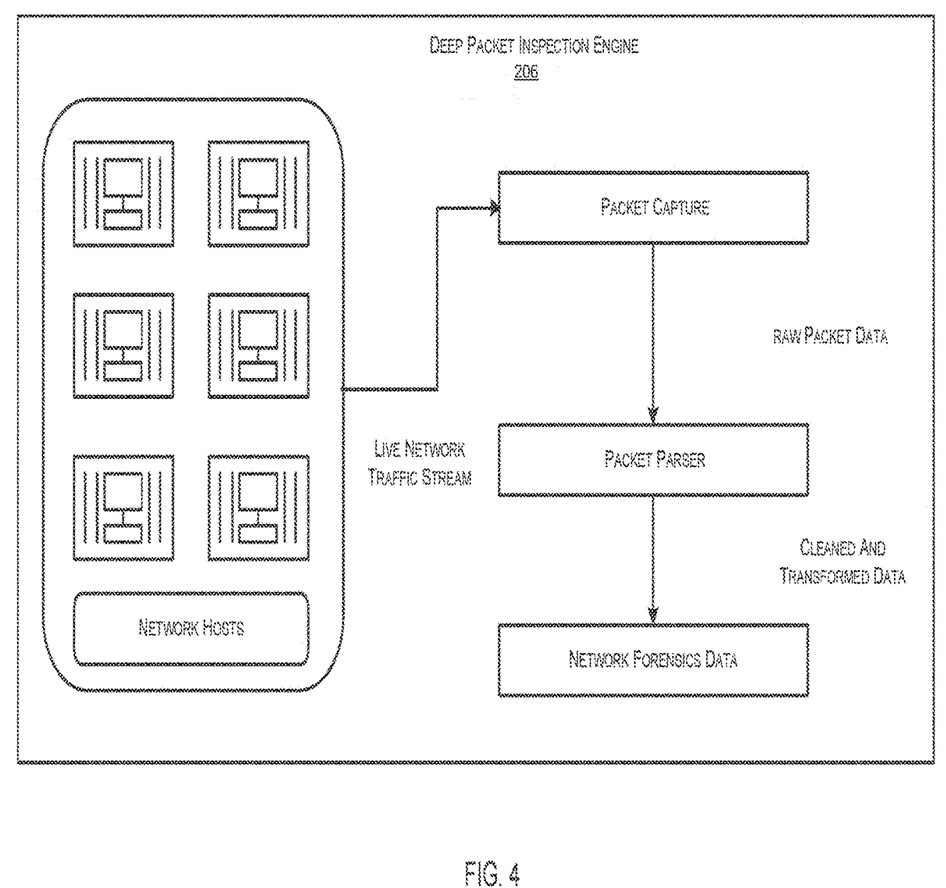
FIG. 4 illustrates a schematic block diagram of the DPI engine of the sensor, according to an embodiment of the present disclosure.

FIG. 4 illustrates a schematic block diagram of the DPI engine 206 of the sensor 104, according to an embodiment of the present disclosure. Deep packet inspection (DPI) looks at the header and footer of a data packet, and further examines a content of the data packet. Since the DPI engine 206 investigates the content of the data packet, it is able to provide a lot of additional information. The honeynets 102 are deployed on the network along with the DPI engine 206, which is used for the generation and extraction of logs and other information for the generation of detailed network forensics data that is sent to the data logging unit 208 for further processing and streaming to collection endpoints.

In some embodiments, the data logging unit 208 ingests the data generated by the honeynets 102, the intrusion detector 204, and the DPI engine 206. The data logging unit 208 performs certain processes such as data pre-processing, data cleaning, data normalisation, appending of geospatial information, etc., and then transmits the data to the data collector 106.

Figure 5:
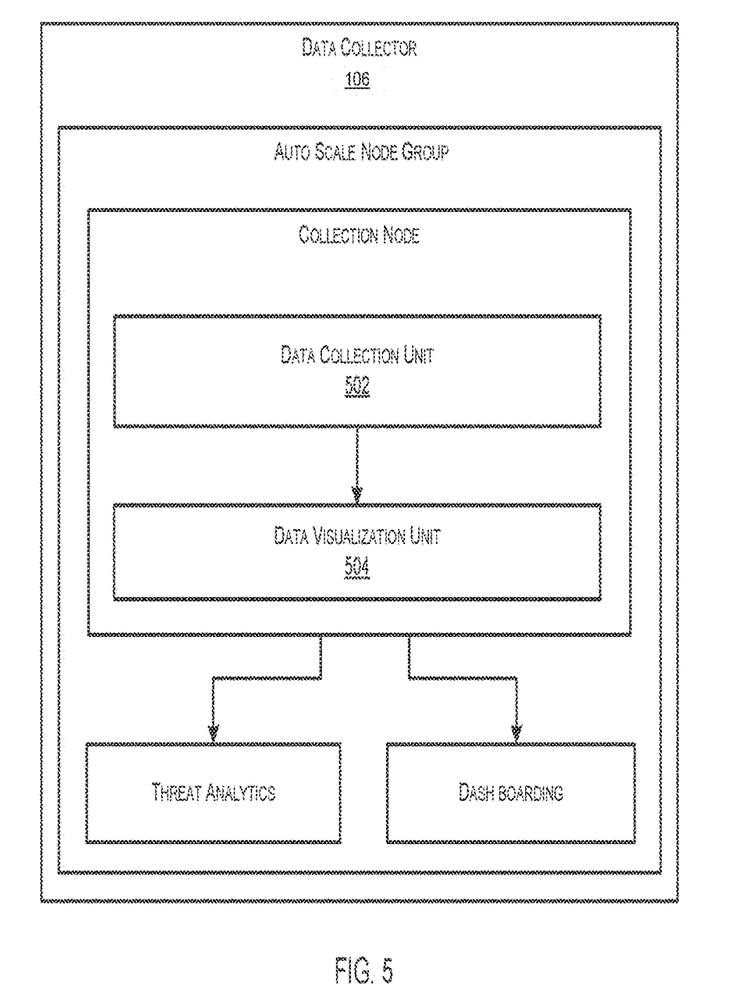
FIG. 5 illustrates a schematic block diagram of the data collector of the system, according to an embodiment of the present disclosure.

FIG. 5 illustrates a schematic block diagram of the data collector 106 of the system 100, according to an embodiment of the present disclosure. The data collector 106 is configured to collect threat data generated by the sensors 104 running vulnerable services deployed in various public cloud infrastructures. The data collector 106 further includes a data collection unit 502 and a data visualisation unit 504. As the data collector 106 is expected to ingest a large amount of live threat data from several sensors 104 in real-time, the data collector 106 is required to be dynamically scalable for handling such varying loads in real-time. To address this issue the components of the data collector 106, i.e., the data collection unit 502 and the data visualisation unit 504, are placed in an autoscale group under a load balancer that automatically spawns new resources as per the input load.

In some embodiments, the data collection unit 502 processes, indexes, and stores the threat data received from the sensors 104 deployed in the public cloud infrastructure. The threat data generated by the sensors 104 are generally in the NoSQL format like JSON documents. In order to handle such type of data format, a real-time distributed full-text search and analytics engine that supports No SQL scheme is used. The data collection unit 502 further provides user management and overall stack management functionalities. For user management, this component provides role-based access to the data indices.

In some embodiments, the visualization unit 504 filters and loads visualizations of the processed and indexed threat data generated by the data collection unit 502. The visualization unit 504 dynamically renders and loads the indexed threat data in real-time and provides other essential functionalities such as reports and analytics generation on the live data.

Figure 6:
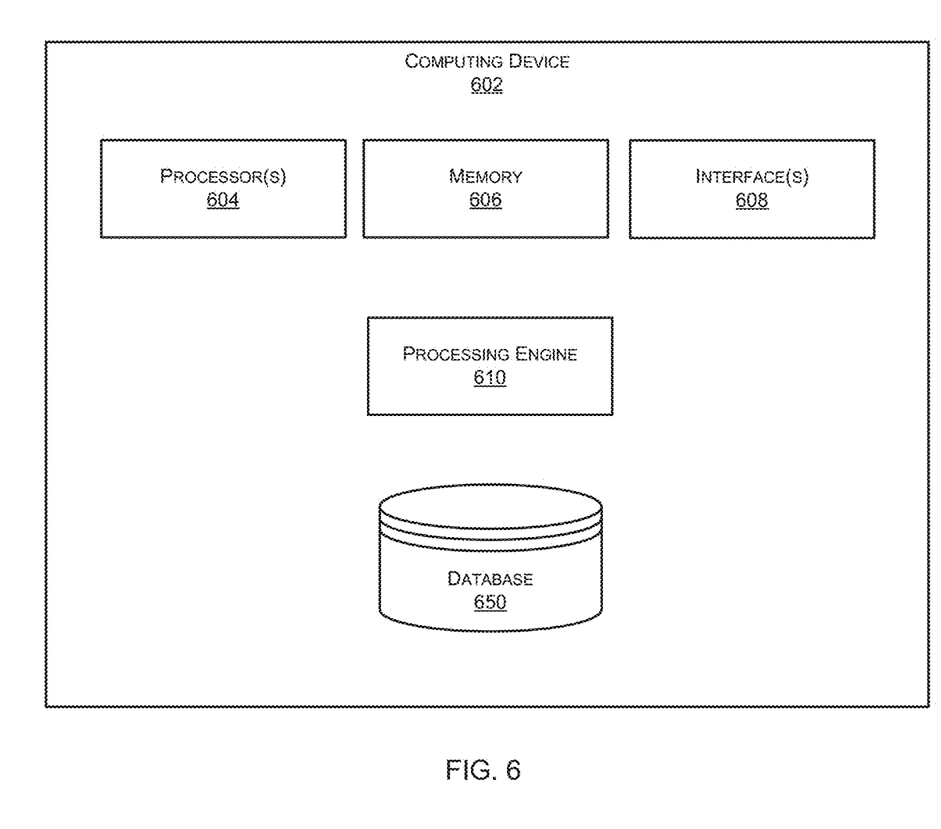
FIG. 6 illustrates a schematic block diagram of the system for generating cyber threat intelligence, according to an embodiment of the present disclosure.

FIG. 6 illustrates a schematic block diagram for the system 100 for generating cyber threat intelligence, according to an embodiment of the present disclosure. The system 100 includes a computing device 602. The computing device 602 includes a processor 604 communicably coupled with a memory 606. The memory 606 stores instructions which when executed by the processor 604 causing the computing device 602 to generate cyber threat intelligence.

In some embodiments, the processor 604 may be implemented as one or more microprocessors, microcomputers, microcontrollers, digital signal processors, central processing units, logic circuitries, and/or any devices that process data based on operational instructions. Among other capabilities, the processor 604 may be configured to fetch and execute computer-readable instructions stored in the memory 606 for facilitating the system 100 to generate cyber threat intelligence. Any reference to a task in the present disclosure may refer to an operation being or that may be performed on data. The memory 606 may be configured to store one or more computer-readable instructions or routines in a non-transitory computer readable storage medium to generate cyber threat intelligence. The memory 606 may include any non-transitory storage device including, for example, volatile memory such as RAM, or non-volatile memory such as EPROM, flash memory, and the like. In some embodiments, the computing device 602 may include an interface 608. The interface 608 may include a variety of interfaces, for example, interfaces for data input and output devices, referred to as I/O devices, storage devices, and the like. The interface 608 may also provide a communication pathway for one or more components of the computing device 602. Examples of such components include, but are not limited to, a processing engine 610 and a database 650.

In some embodiments, the computing device 602 includes the processing engine 610. The processing engine 610 may be implemented as a combination of hardware and programming (for example, programmable instructions) to implement one or more functionalities of the processing engine 610. In examples described herein, such combinations of hardware and programming may be implemented in several different ways. For example, the programming for the processing engine 610 may be processor executable instructions stored on a non-transitory machine-readable storage medium and the hardware for the processing engine 610 may include a processing resource (for example, one or more processors), to execute such instructions. In the present examples, the machine-readable storage medium may store instructions that, when executed by the processing resource, implement the processing engine 610. In such examples, the computing device 602 may include the machine-readable storage medium storing the instructions and the processing resource to execute the instructions, or the machine-readable storage medium may be separate but accessible to the computing device 602 and the processing resource. In other examples, the processing engine 610 may be implemented by electronic circuitry.

Figure 7:
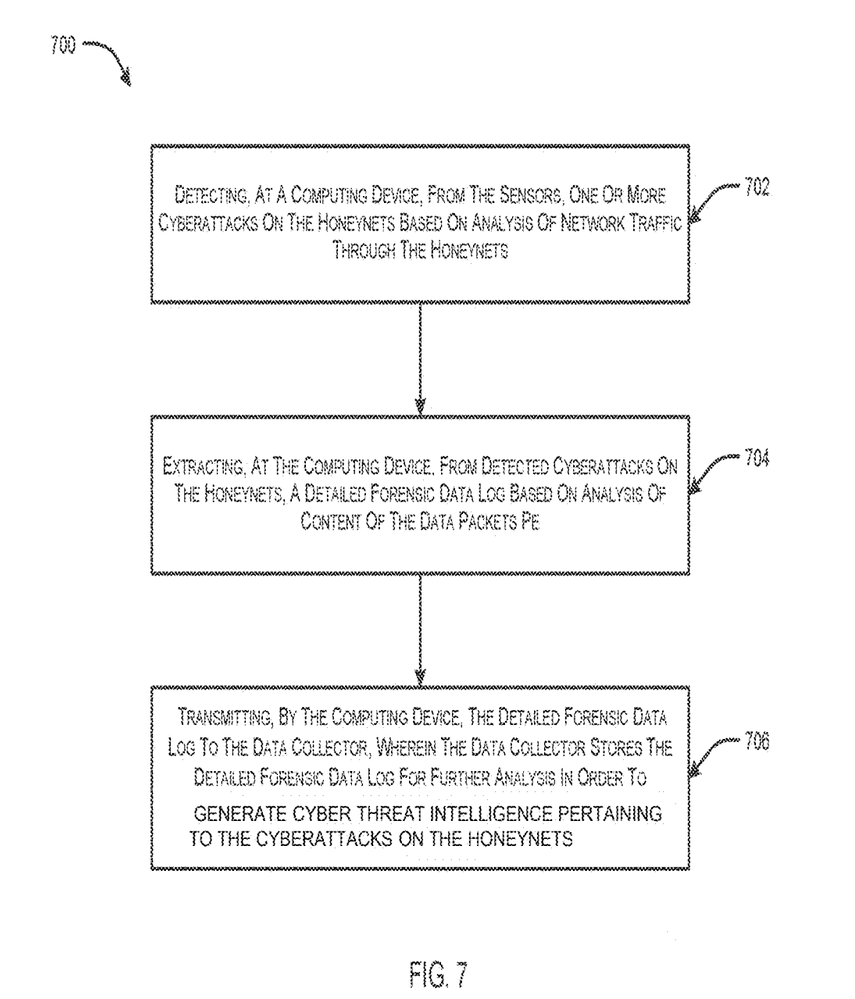
FIG. 7 illustrates a flow chart for a method for generating cyber threat intelligence, according to an embodiment of the present disclosure.

FIG. 7 illustrates a flow chart for a method 700 for generating cyber threat intelligence, according to an embodiment of the present disclosure. At step 702, the method 700 includes detecting, at the computing device, from the sensors, one or more cyberattacks on the honeynets based on analysis of network traffic through the honeynets. At step 704, the method 700 includes extracting, at the computing device, from detected cyberattacks on the honeynets, a detailed forensic data log based on analysis of content of the data packets pertaining to the cyberattacks on the honeynets. At step 706, the method 700 includes transmitting, by the computing device, the detailed forensic data log to the data collector. The data collector stores the detailed forensic data log for further analysis in order to generate cyber threat intelligence.

Figure 8:
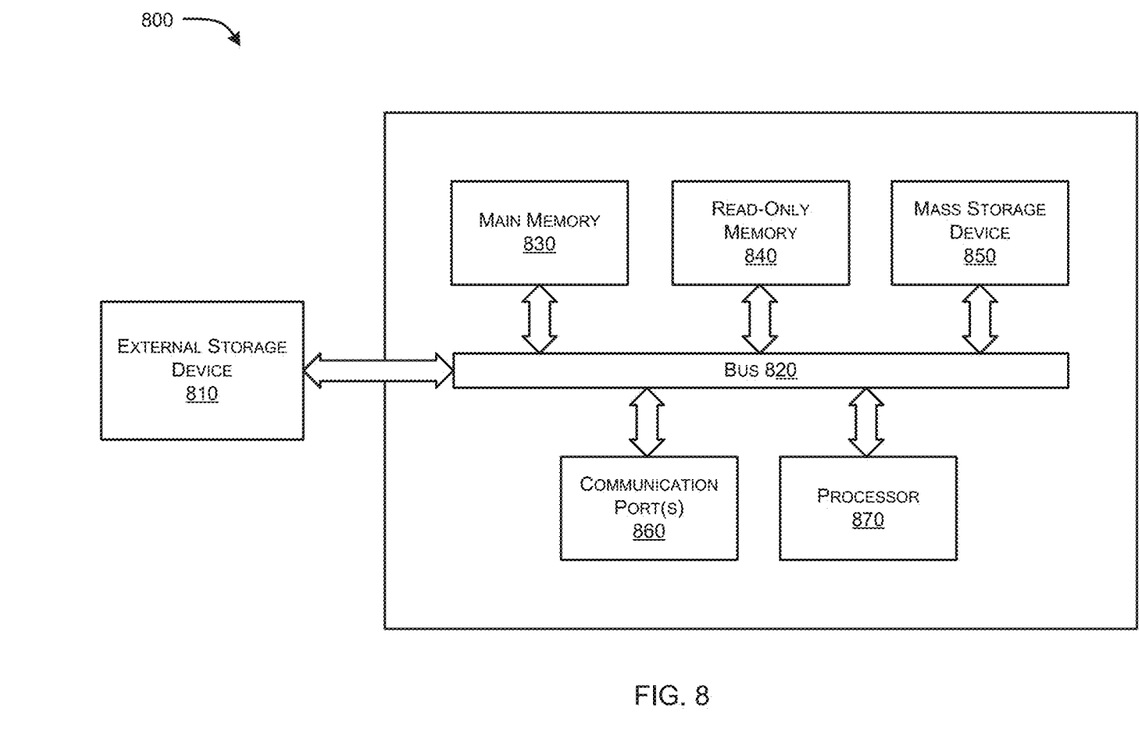
FIG. 8 illustrates an exemplary schematic block diagram of a hardware platform for implementation of the system of FIG. 6.

FIG. 8 illustrates an exemplary schematic block diagram of a hardware platform for implementation of the system 100. As shown in FIG. 8, a computer system 800 can include an external storage device 810, a bus 820, a main memory 830, a read only memory 840, a mass storage device 850, communication port 860, and a processor 870. A person skilled in the art will appreciate that the computer system may include more than one processor and communication ports. Examples of processor 870 include, but are not limited to, an Intel® Itanium® or Itanium 2 processor(s), or AMD® Opteron® or Athlon MP® processor(s), Motorola® lines of processors, FortiSOC™ system on chip processors or other future processors. Processor 870 may include various modules associated with embodiments of the present invention. Communication port 860 can be any of an RS-232 port for use with a modem-based dialup connection, a 10/100 Ethernet port, a Gigabit or 10 Gigabit port using copper or fibre, a serial port, a parallel port, or other existing or future ports. Communication port 860 may be chosen depending on a network, such a Local Area Network (LAN), Wide Area Network (WAN), or any network to which computer system connects. Memory 830 can be Random Access Memory (RAM), or any other dynamic storage device commonly known in the art. Read-only memory 840 can be any static storage device(s) e.g., but not limited to, a Programmable Read Only Memory (PROM) chips for storing static information e.g., start-up or BIOS instructions for processor 870. Mass storage 850 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7102 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 820 communicatively couples processor(s) 870 with the other memory, storage, and communication blocks. Bus 820 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 870 to software system.

Optionally, operator and administrative interfaces, e.g., a display, keyboard, and a cursor control device, may also be coupled to bus 820 to support direct operator interaction with a computer system. Other operator and administrative interfaces can be provided through network connections connected through communication port 860. The external storage device 810 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprise" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While the foregoing describes various embodiments of the invention, other and further embodiments of the invention may be devised without departing from the basic scope thereof. The scope of the invention is determined by the claims that follow. The invention is not limited to the described embodiments, versions, or examples, which are included to enable a person having ordinary skill in the art to make and use the invention when combined with information and knowledge available to the person having ordinary skill in the art.

We claim:

1. A system for generating cyber threat intelligence, the system comprising:
 a plurality of honeynets configured to emulate one or more services;
 a plurality of sensors, each sensor of the plurality of sensors associated with a honeynet, each sensor configured to detect cyberattacks on the associated honeynet;
 a data collector configured to receive data relating to the cyberattacks on the plurality of honeynets; and
 a computing device communicably coupled to the plurality of honeynets, the plurality of sensors and the data collector, the computing device comprising a processor communicably coupled to a memory, the memory storing instructions, which when executed by the processor causes the computing device to be configured to:
  detect, via an intrusion detector of each sensor, cyberattacks on the plurality of honeynets based on an analysis of network traffic through the plurality of honeynets, wherein the cyberattacks are detected using a signature-based ruleset defining malicious connections on basis of predefined signatures including blacklisted IPs and malicious patterns observed from network traffic;
  extract, from the detected cyberattacks on the plurality of honeynets via a deep packet inspection engine of each sensor, a detailed forensic data log based on an analysis of content of data packets pertaining to the cyberattacks on the plurality of honeynets; and
  transmit the detailed forensic data log to the data collector,
 wherein the data collector stores the detailed forensic data log for further analysis to generate the cyber threat intelligence,
 wherein the data collector is configured to:
  process and index a forensic data log received from each sensor;
  dynamically render and load the processed and indexed forensic data log in real-time; and
  provide a user management and overall stack management functionalities, and
 wherein the data collector is placed under a load balancer, wherein the load balancer is configured to spawn additional resources as per load requirement.

2. The system as claimed in claim 1, wherein each sensor of the plurality of sensors is configured to perform pre-processing of the extracted detailed forensic data log prior to transmission of the detailed forensic data log.

3. The system as claimed in claim 1, wherein the system is dynamically scalable.

4. A method for generating cyber threat intelligence, the method comprising:
 detecting, at a computing device, via an intrusion detector of each sensor of the plurality of sensors, cyberattacks on a plurality of honeynets based on an analysis of network traffic through the plurality of honeynets, wherein the cyberattacks are detected using a signature-based ruleset defining malicious connections on basis of predefined signatures including blacklisted IPs and malicious patterns observed from network traffic;

extracting from the detected cyberattacks on the plurality of honeynets, at the computing device via a deep packet inspection engine of each sensor, a detailed forensic data log based on an analysis of content of data packets pertaining to the cyberattacks on the plurality of honeynets; and transmitting, by the computing device, the detailed forensic data log to a data collector, wherein the data collector stores the detailed forensic data log for further analysis to generate the cyber threat intelligence, wherein the data collector is configured to:
- process and index a forensic data log received from each sensor;
- dynamically render and load the processed and indexed forensic data log in real-time; and
- provide a user management and overall stack management functionalities, and wherein the data collector is placed under a load balancer, wherein the load balancer is
- configured to spawn additional resources as per load requirement.

* * * * *